(12) United States Patent
Maehama et al.

(10) Patent No.: US 6,219,492 B1
(45) Date of Patent: Apr. 17, 2001

(54) CAMERA

(75) Inventors: Shinichi Maehama, Osaka; Kenji Nakamura, Sakai, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/343,189

(22) Filed: Jun. 30, 1999

(30) Foreign Application Priority Data

Jul. 3, 1998 (JP) .................................................. 10-188369

(51) Int. Cl.⁷ .................................................. G03B 13/36
(52) U.S. Cl. .................................................. 396/50; 396/121
(58) Field of Search .............................. 396/50, 121, 122, 396/123, 124, 114, 92; 250/201.8

(56) References Cited

U.S. PATENT DOCUMENTS 5,485,004 * 1/1996 Suzuki et al. .................... 250/201.8
5,499,074 * 3/1996 Ohsawa et al. ....................... 396/50

FOREIGN PATENT DOCUMENTS 09090202    4/1997 (JP) .

* cited by examiner

Primary Examiner—W.B. Perkey
(74) Attorney, Agent, or Firm—McDermott, Will & Emery

(57) ABSTRACT

A camera has a distance-measuring device, which has an area sensor for sensing the light from an object to convert it into an electrical signal, a posture detector for detecting the posture of the camera, a setter for setting the positions and sizes of a plurality of calculation regions demarcated on the light-sensing surface of the area sensor in accordance with an output from the posture detector, and a calculator for calculating the distance to the object based on an output from the area sensor that corresponds to the calculation regions set by the setter. The setter can be so controlled as to set the sizes of the calculation regions for distance calculation according to the size of the object that is likely to be detected in those calculation regions. This reduces possibility of low contrast and foreground/background interference, and thereby enhances distance measurement accuracy.

14 Claims, 9 Drawing Sheets

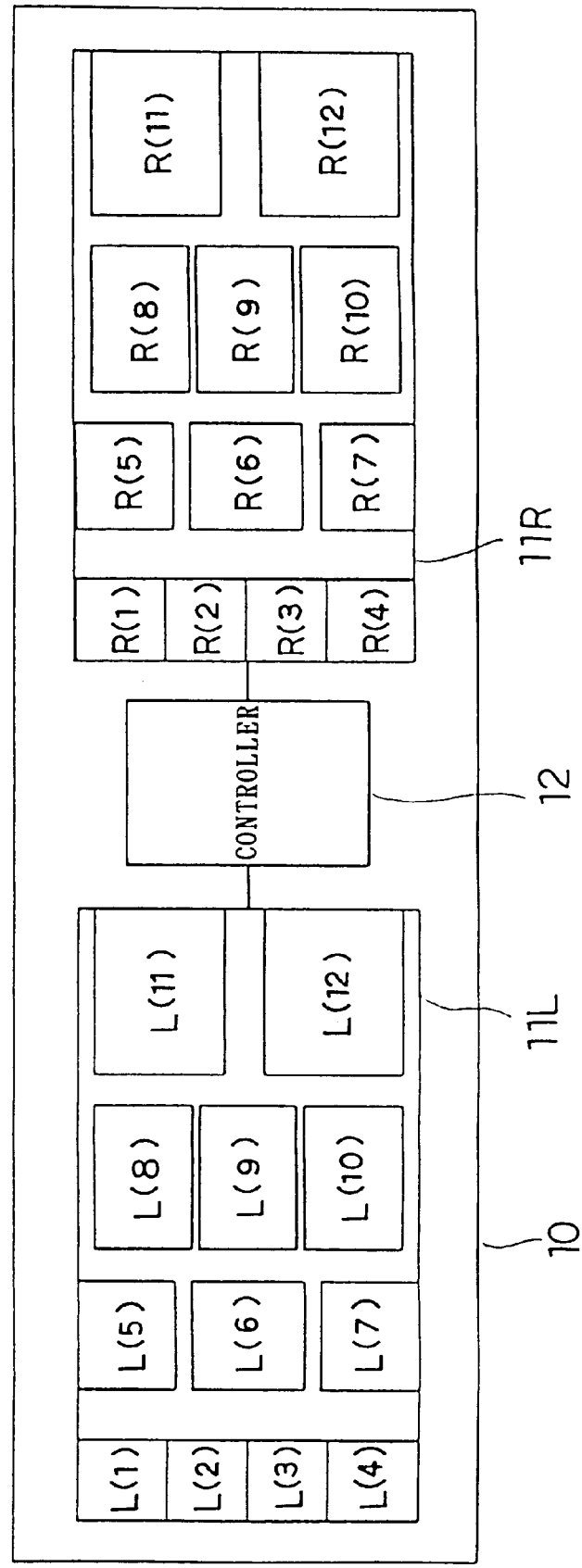

CAMERA

This application is based on application No. H10-188369 filed in Japan, the content of which is hereby incorporated by reference.

BACKGROUND OF THE INVENTION

1. Field of the Invention

The present invention relates to a distance-measuring device, and to a camera provided with a distance-measuring device.

2. Description of the Prior Art

A distance-measuring device measures a distance on the principle of triangulation or the like, and is used, for example, in an automatic focusing (AF) mechanism of a camera. One known method adopted in a distance-measuring device is the passive-type correlation method, which exploits the image of an object intact without emitting light for distance measurement. The principle of this distance measurement method will be described below.

FIG. 6A shows an example of a distance-measuring device adopting the passive-type correlation method, and FIG. 6B shows an example of the signal obtained from the image sensor, realized by the use of a CCD, provided in this distance-measuring device. The light emanating from an object 24 and transmitted through two lenses 20 provided on the right and on the left is focused onto the light-sensing surface of a one-dimensional CCD 23 to form two images thereon along a straight line by means of mirrors 21 and a prism 22. The CCD 23 outputs an image signal as shown in FIG. 6B, where the position on the CCD 23 is taken along the vertical axis and the level of the image signal is taken along the horizontal axis. The distance between the two images varies according to the distance to the object. Accordingly, by subjecting the image signal to correlation calculation, it is possible to determine the distance between the two images and, on the basis of this distance, determine the distance to the object. This is the principle of the passive-type correlation method.

Conventionally, the majority of distance-measuring devices adopting the passive-type correlation method for use in cameras achieve distance measurement by the use of an image sensor having a row of pixels that extends only in the horizontal direction of the screen. For this reason, for example when a portrait is shot, the photographer first locks the focus with the person to be photographed caught within the distance measurement area shown in the viewfinder so as to determine the composition, and then releases the shutter.

To eliminate the need to lock the focus, a distance-measuring device is proposed that employs an area sensor having an array of pixels that extends in both the horizontal and vertical directions so as to sense part or the whole of the shooting field on an area-by-area basis. In a distance-measuring device of this type, distance calculation is performed by the use of signals obtained from specific regions (calculation regions) corresponding to each other on a pair of area sensors. FIGS. 7 and 8 show examples of the relationship between the area sensor and a calculation region in a distance-measuring device of this type.

FIG. 7 shows the above-mentioned relationship as observed when the camera is held in such a posture that the direction of the shorter sides of the shooting screen coincides with the vertical direction of the object (hereafter, this posture of a camera will be referred to as the "horizontal posture"). FIG. 8 shows the same relationship as observed when the camera is held in such a posture that the direction of the longer sides of the shooting screen coincides with the vertical direction of the object (hereafter, this posture of a camera will be referred to as the "vertical posture").

The sensor unit 10 has left-hand and right-hand area sensors 11L' and 11R' and a sensor controller 12 for controlling those area sensors 11L' and 11R'. The smaller areas L'(n) and R'(n) (where n represents a natural number from 1 to 9) within the area sensors 11L' and 11R' are calculation regions demarcated by the sensor controller 12. Note that any two calculation regions bearing the same number n correspond to each other, and distance measurement data is calculated by the use of image signals obtained from mutually corresponding calculation regions.

With a camera provided with such an area-sensor-based distance-measuring device, distance measurement can be performed in varying areas, and accordingly the photographer can release the shutter without locking the focus. In achieving automatic focusing, different cameras adopt different methods of selecting the calculation regions from which to obtain distance measurement data to be used to perform focusing. For example, there is a method that places the calculation regions in the order of priority so that, from among the calculation regions from which distance measurement data can be obtained, the data obtained from those given the highest priority is selected.

However, in a conventional area-sensor-based distance-measuring device adopting the passive-type correlation method, all the calculation regions are of the same size irrespective of their positions. Therefore, in some cases, the object can be inappropriately large or small relative to the calculation regions, and this is a major cause of low distance measurement accuracy. Examples of such cases will be described below with reference to FIGS. 9 to 11. In these examples, it is assumed that the object (i.e. the main object) of which the distance needs to be measured is a person. In these figures, reference numeral 13 represents the area of the shooting screen, reference numeral 14 represents a calculation region, and reference numeral 15 represents the main object.

FIG. 9 shows a case in which the main object 15 is inappropriately small relative to the calculation region 14. In such a case, the main object (a person) coexists with the objects (trees) in the background within the calculation region 14, making it impossible to measure the distance to the main object 15 accurately. Such a situation is called foreground/background interference.

FIG. 10 shows a case in which the main object 15 is inappropriately large relative to the calculation region 14. In such a case, the main object 15 shows low contrast within the calculation region 14, reducing the reliability of distance measurement. Such a situation is called low contrast.

FIG. 11 shows a case in which the main object 15 is appropriately large relative to the calculation region 14. In such a case, there is little influence of the background within the calculation region 14, and the main object 15 shows contrast above an appropriate level. Thus, it is possible to measure the distance appropriately.

Note that, in FIGS. 9 to 11, how the relationship between the size of the calculation region 14 and the size of the object 15 varies is illustrated by varying the size of the calculation region 14 while keeping the size of the object 15 constant within the shooting screen 13. However, in reality, as long as the same object is shot with the same camera, as the distance to the object varies, the size of the object varies while the size of the calculation region 14 remains constant, and as a result the relationship between the size of the calculation region 14 and the size of the object 15 varies. This is because, on the shooting screen, the same object appears small when it is far away and appears large when it is close.

As described above, conventionally, the size of the object can sometimes be inappropriately large or small relative to the calculation regions, causing foreground/background interference or low contrast. This often leads to low distance measurement accuracy, or to improper selection of calculation regions in automatic focusing.

SUMMARY OF THE INVENTION

An object of the present invention is to provide a distance-measuring device that is less prone to low contrast and foreground/background interference and that offers high distant measurement accuracy, and to provide a camera provided with such a distance-measuring device.

To achieve the above object, according to one aspect of the present invention, a camera is provided with: a taking lens; an image sensor for sensing an image of an object brought into focus by the taking lens; and a distancemeasuring device having an area sensor for sensing the light from the object to convert the sensed light into an electrical signal, a posture detector for detecting the posture of the camera, a setter for setting the positions and sizes of a plurality of calculation regions demarcated on the light-sensing surface of the area sensor in accordance with an output from the posture detector, and a calculator for calculating the distance to the object based on an output from the area sensor that corresponds to the calculation regions set by the setter.

According to another aspect of the present invention, a device is provided with: an area sensor for sensing the light from an object to convert the sensed light into an electrical signal; a posture detector for detecting the posture of the device; and a setter for setting the positions and sizes of a plurality of calculation regions demarcated on the light-sensing surface of the area sensor in accordance with an output from the posture detector.

According to still another aspect of the present invention, a method for measuring a distance includes: a step of detecting the posture of a device by means of a posture sensor; a step of, in accordance with an output from the posture sensor, setting the positions and sizes of a plurality of calculation regions demarcated on the light-sensing surface of an area sensor that senses the light from an object to convert the sensed light into an electrical signal; and a step of calculating the distance to the object based on an output from the area sensor that corresponds to the calculation regions thus set.

BRIEF DESCRIPTION OF THE DRAWINGS

This and other objects and features of the present invention will become clear from the following description, taken in conjunction with the preferred embodiments with reference to the accompanying drawings in which:

FIG. 5 is a diagram showing a plurality of calculation regions on the left-hand and right-hand area sensors in the vertical posture;

DESCRIPTION OF THE PREFERRED EMBODIMENTS

Figure 1:
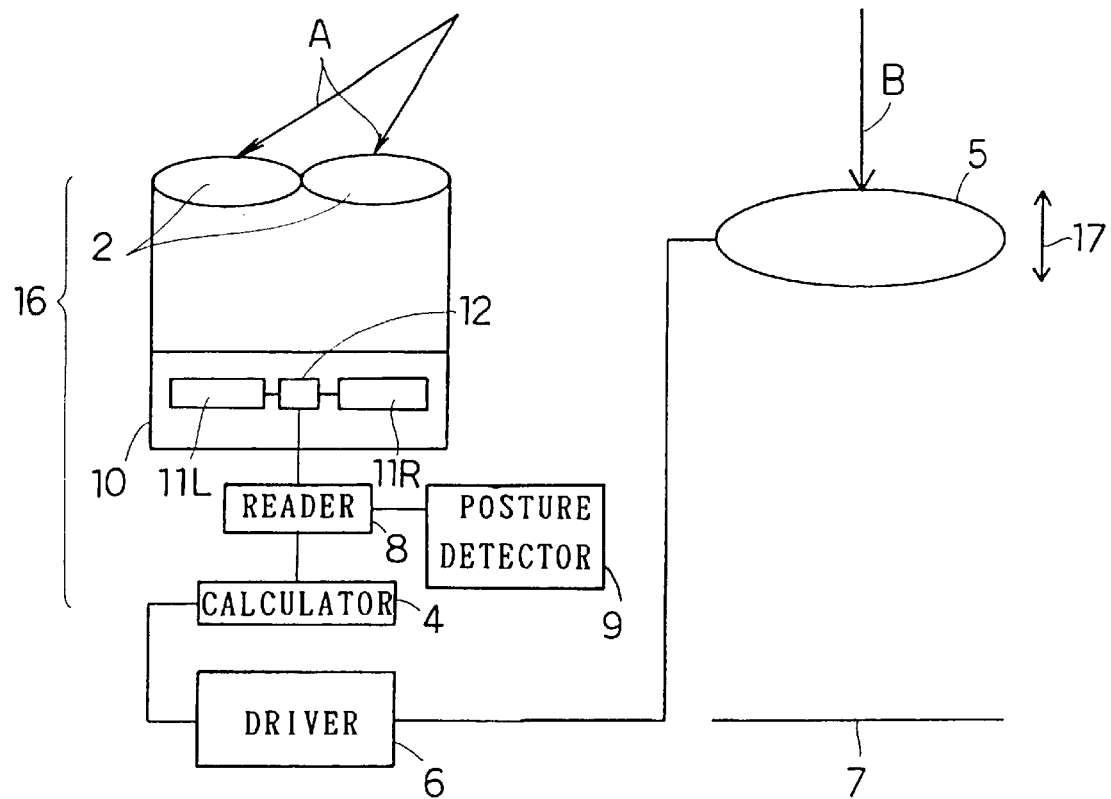
FIG. 1 is a block diagram of a camera embodying the invention.

FIG. 1 shows a block diagram of a camera embodying the present invention. First, the constituent elements of the distance-measuring device 16 will be described. Reference numeral 2 represents a distance measurement optical system composed of two lenses that divide the light beam A from the object into two light beams to bring them into focus individually in two separate regions. Reference numeral 10 represents a sensor means composed of left-hand and right-hand area sensors 11L and 11R for sensing the light beams focused by the distance measurement optical system 2 and a sensor controller 12 for controlling those sensors 11L and 11R. Reference numeral 8 represents a reader for reading the image signal of mutually corresponding calculation regions from the left-hand and right-hand area sensors 11L and 11R through the sensor controller 12. Reference numeral 9 represents a posture detector for detecting the posture of the camera.

Here, the posture of the camera refers to the orientation of the shooting screen relative to the vertical direction of the object that varies according to how the photographer holds the camera, and thus may be considered to be represented by the position of the release button. Specifically, when the camera is held with the release button at the top, the shooting screen is longer horizontally than vertically, and, when the camera is held with the release button at the side, the shooting screen is longer vertically than horizontally. The former is the horizontal posture mentioned earlier, and the latter the vertical posture. The horizontal posture is a first posture in which the direction of the shorter sides of the shooting screen substantially coincides with the vertical direction of the object, and the vertical posture is a second posture in which the direction of the longer sides of the shooting screen substantially coincides with the vertical direction of the object.

The detection result of the posture detector 9 is fed through the reader 8 to the sensor controller 12, which then sets calculation regions on the area sensors 11L and 11R on the basis of that detection result. A description of the calculation regions will be given later. Reference numeral 4 represents a calculator, realized by the use of a microcomputer, for calculating the distance to the object by the passive-type correlation method on the basis of the data read out by the reader 8, then selecting appropriate calculation regions, and then feeding the distance measurement data obtained therefrom out of the distance-measuring device 16. These are the constituent elements of the distance-measuring device 16.

Reference numeral 5 represents a taking lens for directing the light beam B from the object to an image sensor. Reference numeral 7 represents the image sensor, which senses the light beam incident within the shooting screen. Reference numeral 6 represents a driver for adjusting the focal point by driving the taking lens 5 in the direction indicated by the arrow 17 in accordance with the distance measurement data fed from the calculator 4.

Figure 2:
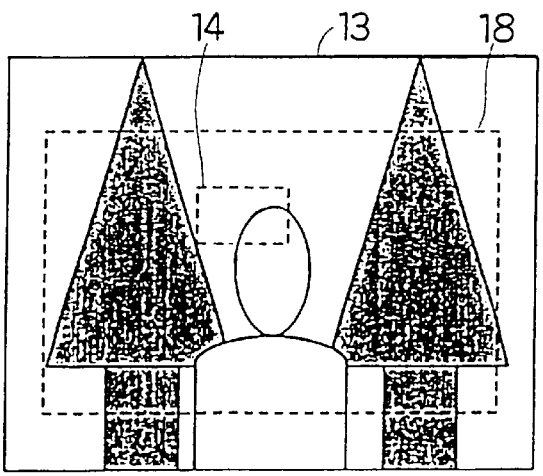
FIG. 2 is a diagram showing the relationship between the shooting screen, the distance measurement region, and a calculation region.

FIG. 2 shows the relationship between the shooting screen, the distance measurement region, and a calculation region. The shooting screen 13 represents the scope of the object that can be sensed by the image sensor 7. The distance measurement region 18 represents the scope of the object that can be detected by the left-hand and right-hand area sensors 11L and 11R. The calculation region 14 is a region demarcated within the distance measurement region 18 for distance measurement calculation. Distance measurement calculation is performed by the use of the image data corresponding to the calculation region 14 out of the entire data detected by the left-hand and right-hand area sensors 11L and 11R. In practice, a plurality of calculation regions are set within the distance measurement region 18. Note that a region on the area sensors 11L and 11R that generates image data corresponding to a calculation region is also referred to as a calculation region.

Figure 3:
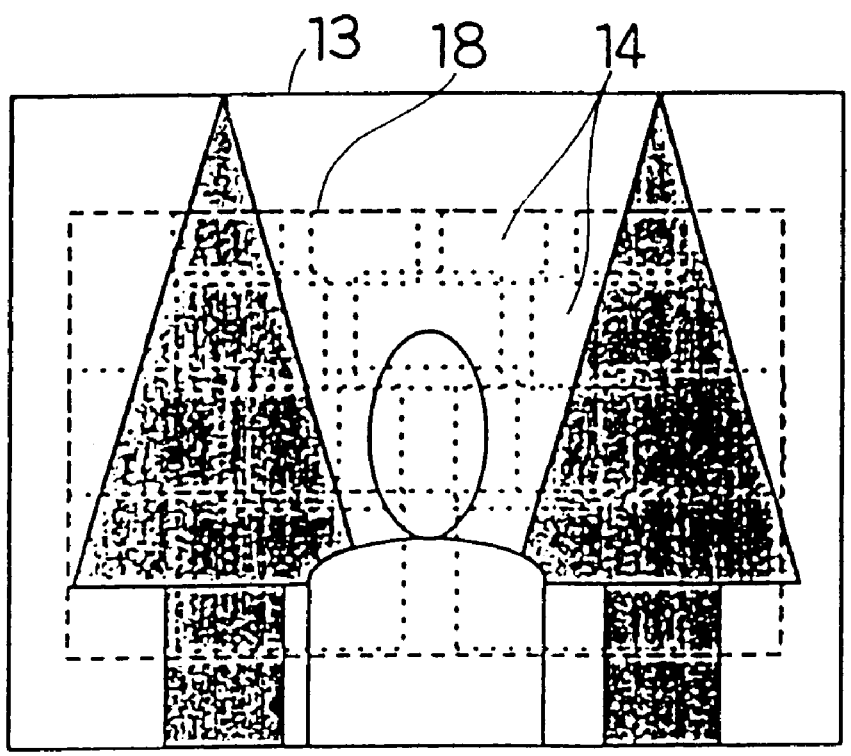
FIG. 3 is a diagram showing the relationship between the shooting screen, the distance measurement region, and a plurality of calculation regions as observed in the horizontal posture.

FIG. 3 shows the relationship between the shooting screen 13, the distance measurement region 18, and a plurality of calculation regions 14 as observed in the horizontal posture in the embodiment under discussion. In general, a large object, such as the ground or a desk, is likely to be detected in a lower portion of the shooting screen 13. Accordingly, in this embodiment, out of a plurality of calculation regions 14, those calculation regions 14 which cover the lower portion of the shooting screen 13 are so set as to be larger than the other calculation regions 14. By contrast, a distant and thus small-appearing object is likely to be detected in an upper portion of the shooting screen 13, and accordingly those calculation regions 14 which cover the upper portion of the shooting screen 13 are so set as to be smaller than the other calculation regions 14.

Figure 4:
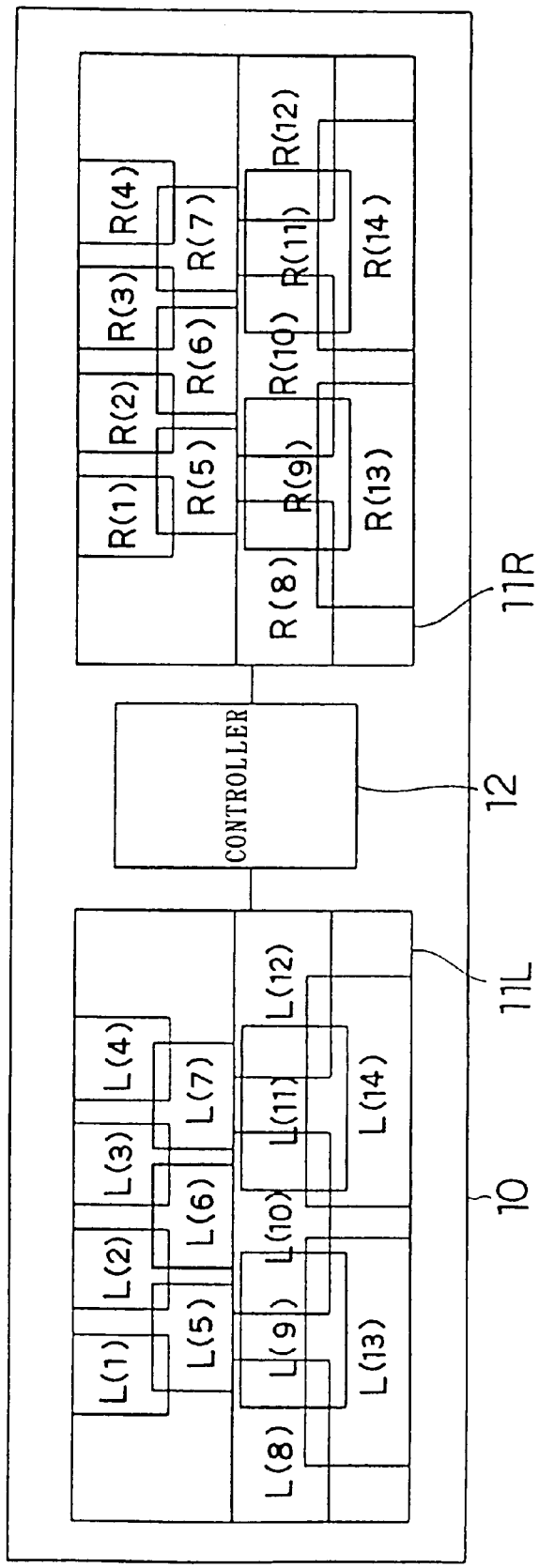
FIG. 4 is a diagram showing a plurality of calculation regions on the left-hand and right-hand area sensors in the horizontal posture.
Figure 6A:
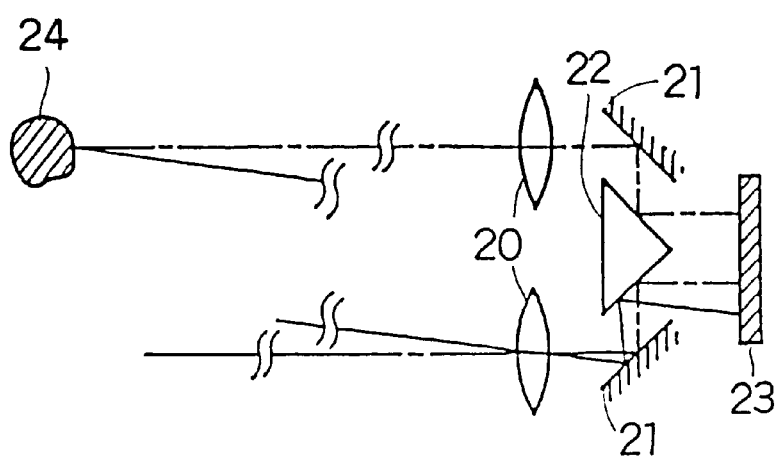
FIG. 6A is a diagram showing an example of a distance-measuring device adopting the passive-type correlation method.
Figure 6B:
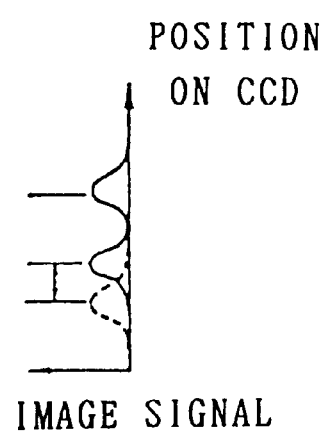
FIG. 6B is a diagram showing an example of the image signal obtained from the distance-measuring device shown in FIG. 6A.
Figure 7:
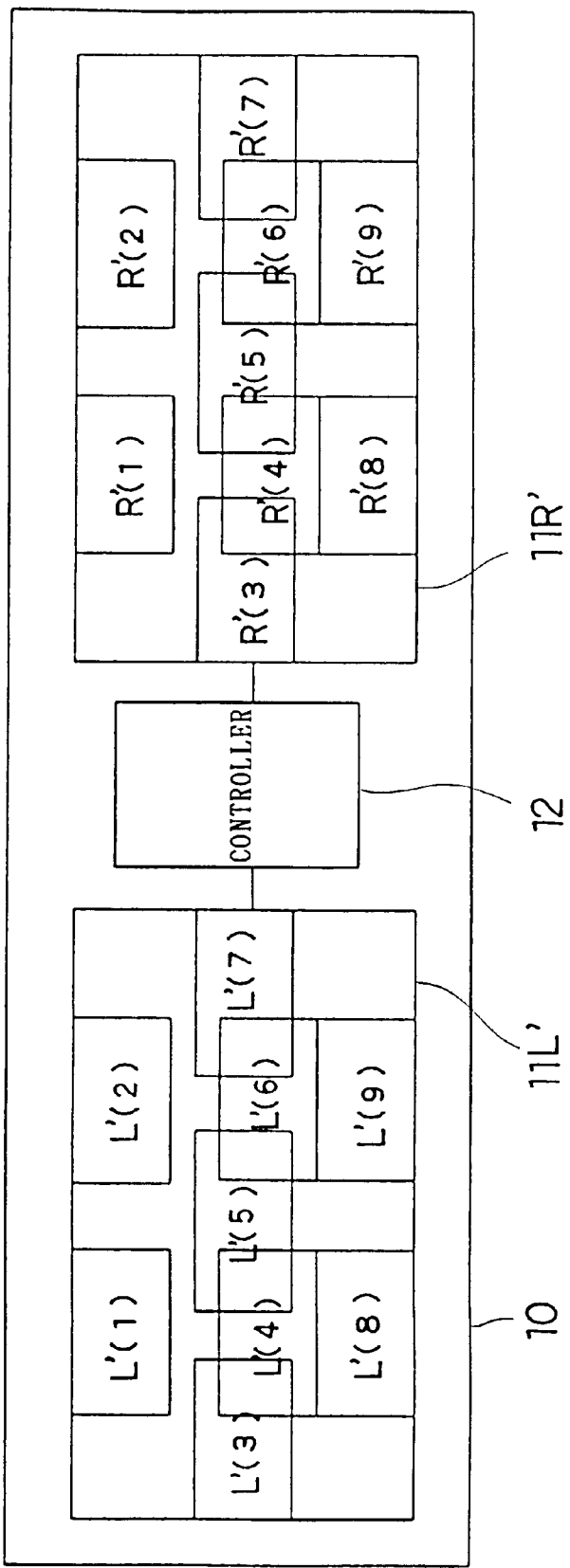
FIG. 7 is a diagram showing the relationship between the area sensor and a calculation region as observed in the horizontal posture in a conventional distance-measuring device.
Figure 8:
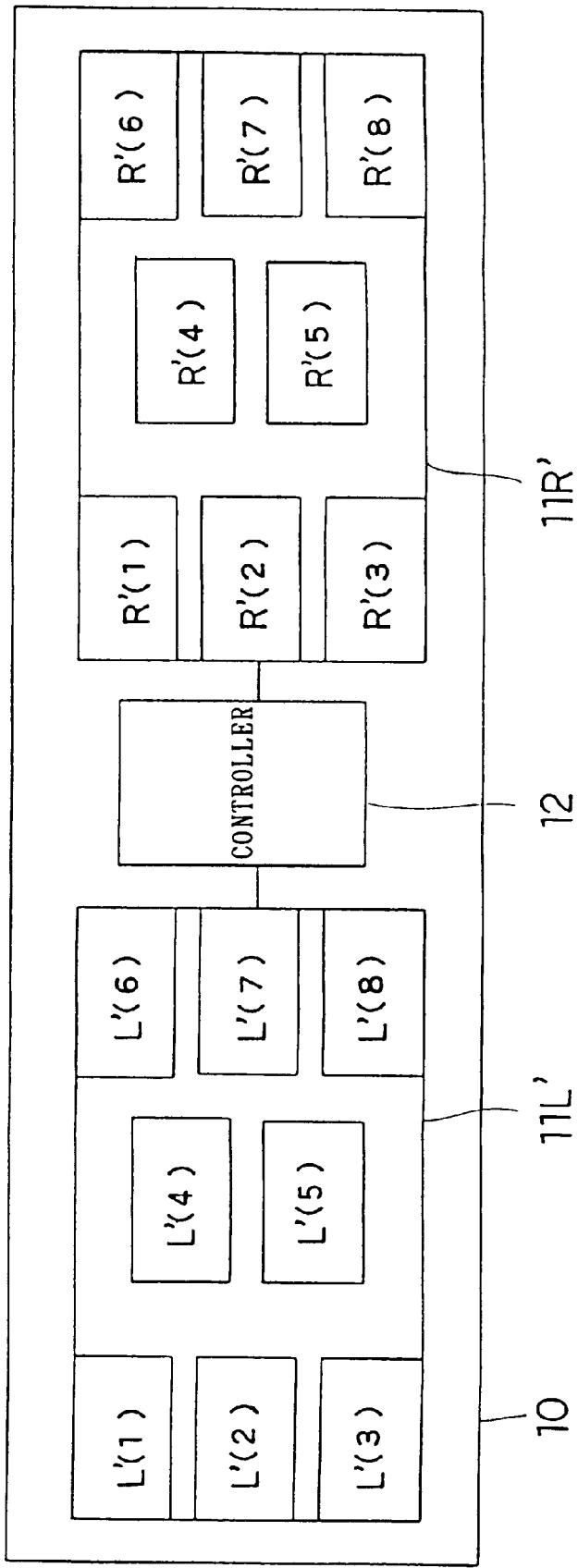
FIG. 8 is a diagram showing the relationship between the area sensor and a calculation region as observed in the vertical posture in a conventional distance-measuring device.
Figure 9:
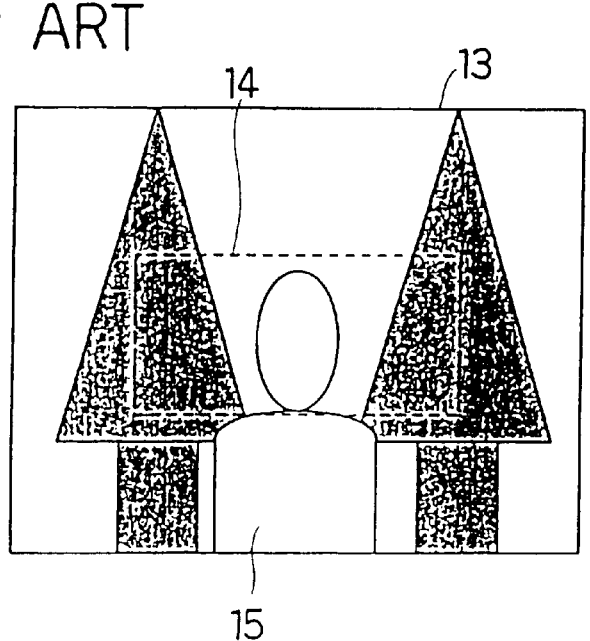
FIG. 9 is a diagram illustrating foreground/background interference.
Figure 10:
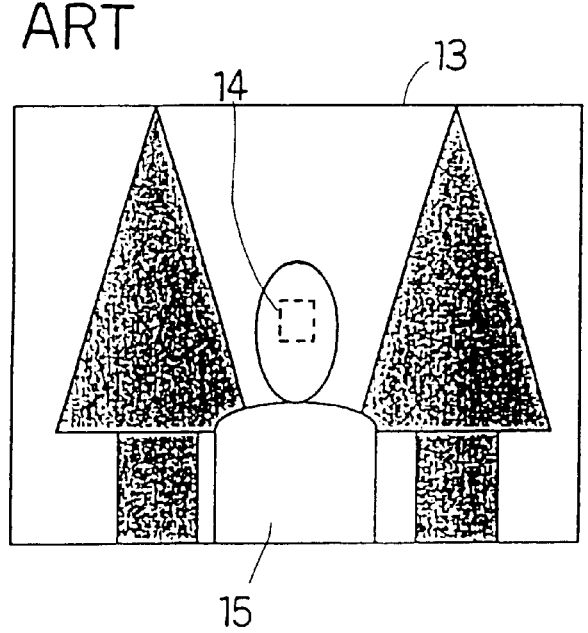
FIG. 10 is a diagram illustrating low contrast.
Figure 11:
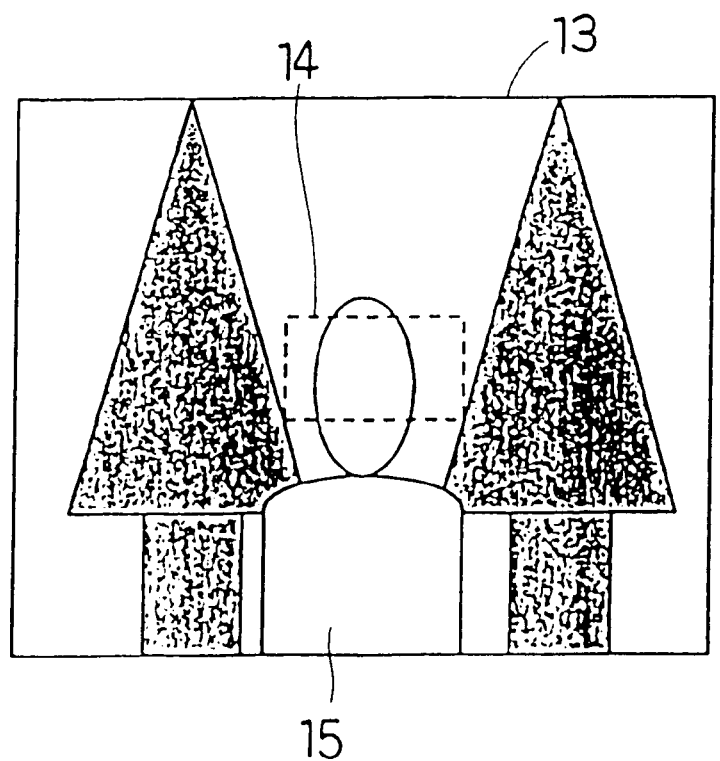
FIG. 11 is a diagram showing a case in which the object is appropriately large relative to a calculation region.

FIG. 4 shows a plurality of calculation regions L(n) and R(n) (where n represents a natural number from 1 to 14) on the area sensors 11L and 11R that correspond to the calculation regions shown in FIG. 3. Within each of the lefthand and right-hand area sensors 11L and 11R, the calculation regions are so set as to be increasingly large toward the lower end of the drawing, which corresponds to the lower end of the shooting screen 13 shown in FIG. 3, and increasingly small toward the upper end of the drawing.

FIG. 5 shows a plurality of calculation regions L(n) and R(n) (where n represents a natural number from 1 to 12) on the area sensors 11L and 11R in the vertical posture. Also in the vertical posture, the calculation regions are so set that those covering the lower portion of the shooting screen 13 are larger than the others and those covering the upper portion of the shooting screen 13 are smaller than the others.

In the vertical posture, the direction of the longer sides of the shooting screen 13 coincides with the vertical direction, and therefore the direction of the longer sides of the area sensors 11L and 11R coincides with the vertical direction. Accordingly, the calculation regions are so set as to be increasingly large toward the right-hand end of the drawing, which corresponds to the lower end of the shooting screen 13, and increasingly small toward the left-hand end of the drawing.

Note that, in the vertical posture, the upper and lower portions of the shooting screen 13 may be reversed depending on how the photographer holds the camera. Specifically, whereas the camera is typically held with the release button at the right side, it is also possible to hold the camera with the release button at the left side. In the embodiment under discussion, even this state can be detected by the posture detector 9. In that case, the calculation regions are set in a different manner from the case shown in FIG. 5, specifically in such a way as to be increasingly small toward the right-hand end of the drawing and increasingly large toward the left-hand end of the drawing.

Out of the image signals detected by the area sensors 11L and 11R shown in FIGS. 4 and 5, by the use of the image signals obtained from the calculation regions L(n) and R(n) bearing the same number n on the left-hand and right-hand area sensors 11L and 11R, the distance measurement data of the individual calculation regions is calculated.

In the camera of the embodiment described above, the calculation regions for distance measurement data calculation are so set that the object detected in a calculation region is kept appropriately large relative to that calculation region. This reduces possibility of low contrast and foreground/background interference, and thus enhances distance measurement accuracy. Moreover, since distance measurement data is calculated accurately in a plurality of regions, it is possible to select, as distance measurement data to be used to perform automatic focusing, distance measurement data obtained from appropriate calculation regions.

What is claimed is:

1. A camera comprising:
    an area sensor for sensing light from the object to convert the sensed light into an electrical signal;
    a posture detector for detecting a posture of the camera;
    a setter for setting positions and sizes of a plurality of calculation regions demarcated on a light-sensing surface of the area sensor including setting a size of a particular calculation region to be different from a size of other calculation regions in accordance with an output from the posture detector; and
    a calculator for calculating a distance to the object based on an output from the area sensor that corresponds to the calculation regions set by the setter.

2. A camera as claimed in claim 1,
    wherein the area sensor has a first light-sensing portion and a second light-sensing portion, the first and second light-sensing portions individually receiving the light from the object through two separate optical systems having different optical axes from each other, the calculator calculating the distance by performing correlation calculation on outputs from mutually corresponding calculation regions on the first and second light-sensing portions.

3. A camera as claimed in claim 1,
    wherein the setter sets the calculation regions in such a way that those calculation regions which correspond to an area vertically below the object are larger than the other calculation regions.

4. A camera as claimed in claim 1,
   wherein the posture detector detects the posture of the camera by distinguishing a plurality of postures including a first posture in which a direction of shorter sides of a shooting screen substantially coincides with a vertical direction of the object and a second posture in which a direction of longer sides of the shooting screen substantially coincides with the vertical direction of the object.

5. A camera as claimed in claim 1, further comprising a driver for driving a taking lens in accordance with a result of calculation performed by the calculator.

6. The camera of claim 1, wherein
   when the posture of the camera is that a direction of shorter sides of a shooting screen substantially coincide with a vertical direction of the object, the setter sets the calculation regions so that the size of all calculation regions at a bottom of the light-sensing surface of the area sensor corresponding to a bottom of the shooting screen are larger than the size of all calculation regions at a top of the light-sensing surface of the area sensor corresponding to a top of the shooting screen, with the size of the calculation regions between the top and bottom of the light-sensing surface of the area sensor increasing in the direction from the top to the bottom of the light-sensing surface of the area sensor, and
   when the posture of the camera is that a direction of longer sides of a shooting screen substantially coincide with the vertical direction of the object, the setter sets the calculation regions so that the size of all calculation regions at a right side/left side of the light-sensing surface of the area sensor corresponding to a right side/left side of the shooting screen are larger than the size of all calculation regions at the left side/right side of the light-sensing surface of the area sensor corresponding to a left side/right side of the shooting screen, with the size of the calculation regions between the left side/right side and the right side/left side of the light-sensing surface of the area sensor increasing in the direction from the left side/right side to the right side/left side of the light-sensing surface of the area sensor.

7. A device comprising:
   an area sensor for sensing light from an object to convert the sensed light into an electrical signal;
   a posture detector for detecting a posture of the device; and
   a setter for setting positions and sizes of a plurality of calculation regions demarcated on a light-sensing surface of the area sensor including setting a size of a particular calculation region to be different from a size of other calculation regions in accordance with an output from the posture detector.

8. A device as claimed in claim 7, further comprising;
   a calculator for calculating a distance to the object based on an output from the area sensor that corresponds to the calculation regions set by the setter.

9. A device as claimed in claim 8,
   wherein the area sensor has a first light-sensing portion and a second light-sensing portion, the first and second light-sensing portions individually receiving the light from the object through two separate optical systems having different optical axes from each other, the calculator calculating the distance by performing correlation calculation on outputs from mutually corresponding calculation regions on the first and second light-sensing portions.

10. A device as claimed in claim 7,
    wherein the setter sets the calculation regions in such a way that those calculation regions which correspond to an area vertically below the object are larger than the other calculation regions.

11. The device of claim 7, wherein
    when the posture of the camera is that a direction of shorter sides of a shooting screen substantially coincide with a vertical direction of the object, the setter sets the calculation regions so that the size of all calculation regions at a bottom of the light-sensing surface of the area sensor corresponding to a bottom of the shooting screen are larger than the size of all calculation regions at a top of the light-sensing surface of the area sensor corresponding to a top of the shooting screen, with the size of the calculation regions between the top and bottom of the light-sensing surface of the area sensor increasing in the direction from the top to the bottom of the light-sensing surface of the area sensor, and
    when the posture of the camera is that a direction of longer sides of a shooting screen substantially coincide with the vertical direction of the object, the setter sets the calculation regions so that the size of all calculation regions at a right side/left side of the light-sensing surface of the area sensor corresponding to a right side/left side of the shooting screen are larger than the size of all calculation regions at the left side/right side of the light-sensing surface of the area sensor corresponding to a left side/right side of the shooting screen, with the size of the calculation regions between the left side/right side and the right side/left side of the light-sensing surface of the area sensor increasing in the direction from the left side/right side to the right side/left side of the light-sensing surface of the area sensor.

12. A method for measuring a distance, comprising:
    a step of detecting a posture of a device by means of a posture sensor;
    a step of setting positions and sizes of a plurality of calculation regions demarcated on a light-sensing surface of an area sensor that senses light from an object to convert the sensed light into an electrical signal, including setting a size of a particular calculation region to be different from a size of other calculation regions in accordance with an output from the posture sensor; and
    a step of calculating a distance to the object based on an output from the area sensor that corresponds to the calculation regions thus set.

13. A method for measuring a distance as claimed in claim 12,
    wherein, in the setting step, the calculation regions are set in such a way that those calculation regions which correspond to an area vertically below the object are larger than the other calculation regions.

14. The method of claim 12, wherein
    when the posture of the camera is that a direction of shorter sides of a shooting screen substantially coincide with a vertical direction of the object, the step of setting positions and size of the plurality of calculation regions sets the calculation regions so that the size of all calculation regions at a bottom of the light-sensing surface of the area sensor corresponding to a bottom of the shooting screen are larger than the size of all calculation regions at a top of the light-sensing surface of the area sensor corresponding to a top of the shooting screen, with the size of the calculation regions between the top and bottom of the light-sensing surface of the area sensor increasing in the direction from the top to the bottom of the light-sensing surface of the area sensor, and when the posture of the camera is that a direction of longer sides of a shooting screen substantially coincide with the vertical direction of the object, the step of setting positions and size of the plurality of calculation regions sets the calculation regions so that the size of all calculation regions at a right side/left side of the light-sensing surface of the area sensor corresponding to a right side/left side of the shooting screen are larger than the size of all calculation regions at the left side/right side of the light-sensing surface of the area sensor corresponding to a left side/right side of the shooting screen, with the size of the calculation regions between the left side/right side and the right side/left side of the light-sensing surface of the area sensor increasing in the direction from the left side/right side to the right side/left side of the light-sensing surface of the area sensor.

* * * * *